UNITED STATES PATENT OFFICE 2,675,361

PREPARATION OF SYNTHETIC RUBBER-CARBON BLACK MIXTURES USING THE RESIDUE FROM THE ALKALI EXTRACTION OF BARK

Louis H. Howland, Watertown, Conn., assignor to United States Rubber Company, New York, N. Y., a corporation of New Jersey No Drawing. Application March 14, 1952, Serial No. 276,687

6 Claims. (Cl. 260—17.4)

This invention relates to the preparation of synthetic rubber-carbon black mixtures.

Synthetic rubber-carbon black mixtures for further compounding and manufacture into finished articles are commonly prepared today by mixing an aqueous suspension of the carbon black with the synthetic rubber latex and coagulating the mixture in the usual manner with salt and/or acid coagulating agents, filtering the crumb coagula, and washing and drying to form a synthetic rubber-carbon black mix which may be baled and shipped similarly to the ordinary synthetic rubber. Such commercial practice is described in an article by Madigan and Adams entitled "Latex Incorporated Carbon Black for Synthetic Rubber" in Chemical Engineering Progress, 44, 815–820 (November 1948). Various methods have been proposed for extending such coagulated synthetic rubber-carbon black mixtures with inexpensive materials.

I have found that if the synthetic rubber latex and carbon black suspension are mixed with a specially prepared finely divided filler before coagulation, the calender shrinkage of compounded stocks made from the thus prepared synthetic rubber and carbon black mixture is advantageously reduced without the undesirable reduction in the high temperature and aged physical properties of the cured compounds which is known to accompany the use of conventional comminuted inert fillers.

In carrying out the present invention, there is included in the mixture of the synthetic rubber latex and aqueous suspension of carbon black a comminuted (finely divided or ground) cellulosic portion of tree bark that has been alkali extracted and separated from the alkali extracting solution and, while wet, admixed with the synthetic rubber latex and aqueous suspension of carbon black. Alkali extractions of the amorphous particles obtained from the highly parenchymous tissue of ground Douglas fir bark, both as a clarified solution and as the unclarified liquid containing the insoluble material which is associated with the amorphous bark particles, have been used as dispersing agents for suspending carbon black in water for mixing with synthetic rubber latex before co-coagulation. This is shown in U. S. Patent 2,548,757, where it states with reference to using the whole unclarified extract containing the insoluble material: "The insoluble material which is mostly bast fibers does no harm in the final synthetic rubber-carbon black mixture." (Col. 2, lines 29–32). However, the incorporation of an amount of such insoluble material that would affect the properties of compounds made from the rubber-carbon black mixture when added with the extracting solution would inherently and necessarily be accompanied by excessive amounts of undesirable vulcanization retarders from the large amount of soluble alkali extract, and these large amounts of retarders or alkali solubles impart inferior resilience and heat build-up and hysteresis properties to vulcanizates made from the rubber-carbon black mix. It is entirely unforeseeable that the wet cellulosic residue of the alkali extraction of comminuted tree barks when incorporated in the synthetic rubber latex and carbon black slurry mixture before coagulation imparts improved calender shrinkage to compounded stocks without detrimentally reducing the high temperature and aged physical properties of the cured compounds.

In carrying out the present invention, comminuted tree bark is extracted with an aqueous alkali solution and the liquid alkali extract containing the alkali soluble lignin and undesirable vulcanization retarders is separated from the insoluble cellulosic portion of the bark, as by decanting or filtering. The separated wet cellulosic residue may be directly incorporated with the synthetic rubber latex and aqueous suspension of carbon black, but it is preferred to first wash it with water. The cellulosic residue may be diluted with water, with or without washing, prior to mixing with the synthetic rubber latex and aqueous suspension of carbon black. The mixture of the latex and carbon black slurry and extracted comminuted tree bark is coagulated in the conventional manner with salts and/or acids. The tree bark may be comminuted in any conventional manner. Many ground barks are sold in commerce as bark dusts. Other barks which are obtained in large pieces may be broken up and ground or ball-milled, or otherwise comminuted before extraction. Generally the bark should be sufficiently finely divided so that substantially all will pass a 70 mesh screen. The alkali solution for extracting the comminuted tree bark may be an aqueous solution of sodium, potassium or ammonium hydroxide. The concentration of the alkali solution is not critical. The preferred range of 0.5% to 5% alkali concentration are satisfactory. The extraction may be at room temperature, but is preferably at an elevated temperature from 80° C. to 100° C., for a time necessary to extract the alkali solubles, generally one-fourth to five hours, depending on the particular bark, its degree of comminution, the temperature, and the concentration of the alkali.

The amounts of extracted comminuted bark residue that will give improvements in the calender and extrusion shrinkage without reducing the high temperature and age characteristics of the cured compound may be from 5 to 50 parts per 100 parts of the synthetic rubber. The amount of carbon black is conventional, and may be from 30 to 100 parts per 100 parts of the synthetic rubber. The same ratios of extracted tree bark residue and carbon black to synthetic rubber will be present in the aqueous mixture of the three before co-coagulation.

As is known, synthetic rubber latices are prepared by the emulsion polymerization of unsaturated monomers, e. g. butadiene-1,3 and styrene in the preparation of GR-S latex. The amount of emulsifying and dispersing agents used is not critical, generally 3 to 6 parts per 100 parts of polymerizable monomers being used. The emulsifying and dispersing agent may be conventional soaps and/or sulfates or sulfonates of organic compound containing at least one group having more than 8 carbon atoms. The polymerization is allowed to take place at temperatures varying from 0° F. to 150° F. Conventional GR-S polymerization is made to take place at about 122° F. and so-called cold GR-S is polymerized at about 41° F. Various known catalysts and regulators are used in these polymerizations. In practice, the emulsion polymerization is not allowed to go to completion because of the excessive time necessary for complete conversion of the polymerizable monomers and because of the undesirable properties that may be imparted to the synthetic rubber when the polymerization has been permitted to go to completion. The polymerization is usually permitted to go to around 50 to 85% of completion, as determined by consumption of polymerizable monomers and is stopped by the addition of a so-called shortstopping agent which prohibits further polymerization of the monomers during their removal. Hydroquinones and similar materials are common shortstopping agents. After addition of the shortstopping agent, the unreacted residual polymerizable monomers are removed from a synthetic rubber latex, as by venting off monomers which are gaseous at atmospheric pressure, e. g. butadiene-1,3, and steam distilling under reduced pressure the residual higher boiling point or liquid monomers, e. g., styrene, and the thus recovered polymerizable monomers may be utilized in subsequent emulsion polymerizations. In general, the concentration of the latex will be from 15 to 40% solids content.

The polymerizable material in the preparation of the synthetic rubber latex may be one or a mixture of butadienes-1,3, for example, butadiene-1,3, methyl-2-butadiene-1,3 (isoprene), chloro-2-butadiene-1,3 (chloroprene), piperylene, 2,3-dimethyl butadiene-1,3. The polymerizable material, as is known, may be a mixture of one or more such butadienes with one or more polymerizable compounds which are capable of forming rubber copolymers with butadienes-1,3; for example, up to 70% of such mixture of one or more compounds which contain a single $CH_2=C<$ group where at least one of the disconnected valences is attached to an electronegative group, that is, a group which substantially increases the electrical dissymmetry or polar character of the molecule. Examples of such monoolefines containing a terminal methylene ($CH_2=C<$) group and are copolymerizable with butadienes-1,3, are aryl olefines, such as styrene, vinyl naphthalene; alpha methyl styrene, para chloro styrene, dichloro styrene, dichloro-alpha methyl styrene; the alpha methylene carboxylic acids and their esters, nitriles and amides, such as acrylic acid, methyl acrylate, methyl methacrylate, acrylonitrile, methacrylonitrile, methacrylamide; methyl vinyl ether, methyl vinyl ketone; vinylidene chloride; vinyl carbazole; vinyl pyridines; alkyl substituted vinyl pyridines.

The carbon black which is made into an aqueous slurry and mixed with the synthetic rubber latex, may be any of the carbon blacks used with synthetic rubbers, such as reinforcing or semi-reinforcing channel blacks or furnace blacks, e. g., easy processing channel (EPC) blacks, high abrasion furnace (HAF) blacks, high modulus furnace (HMF) blacks, and semi-reinforcing furnace (SRF) blacks. The aqueous suspension or slurry of the carbon black may be prepared with the aid of conventional dispersing agents which are generally sulfates and sulfonates of organic compounds containing at least one group having more than 8 carbon atoms. The preparation of carbon black slurries for mixing with synthetic rubber latex is well known (see "Master Batches from Carbon Black with GR-S Latices" by Adams, Messer and the present applicant; Ind. Eng. Chem. 43, 754–765 (1951)). In general, the carbon blacks slurry will have a solids concentration in the range of 10 to 30%.

The sulfate and sulfonate surface-active agents which may be used to disperse the carbon black in water to mix with the latex, and which may be used with or without soaps as emulsifying and dispersing agents in the preparation of the synthetic rubber latex and those having a general formula $R—SO_3M$, where M represents alkali, that is, alkali metal, ammonium or substituted ammonium (amine) radical, and R represents an organic radical containing at least one group having more than 8 carbon atoms, and generally not more than 24 carbon atoms. Such organic group is the hydrophobic group that forms part of the anion of the surface-active agent in water. Examples of such anionic surface-active agents are:

(1) Alkyl sulfonates (e. g. dodecyl sodium sulfonate, cetyl potassium sulfonate).

(2) Alkyl sulfates (e. g. sodium dodecyl sulfate, sodium oleyl sulfate).

(3) Sulfonated ethers of long and short chain aliphatic groups (e. g.

(4) Sulfated ethers of long and short chain aliphatic groups (e. g.

(5) Sulfonated alkyl esters of long chain fatty acids (e. g.

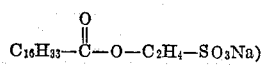

(6) Sulfonated glycol esters of long chain fatty acids (e. g.

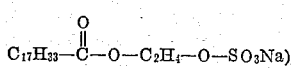

(7) Sulfonated alkyl substituted amids of long chain fatty acids (e. g.

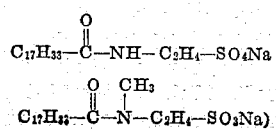

(8) Alkylated aryl sulfonates (e. g. isopropyl naphthalene sodium sulfonate, dodecyl benzene sodium sulfonate).

(9) Hydroaromatic sulfonates (e. g. tetrahydronaphthalene sodium sulfonate).

(10) Alkyl sulfosuccinates (e. g. dioctyl sodium sulfosuccinate).

(11) Aryl sulfonate-formaldehyde condensation products (e. g. condensation product of formaldehyde and sodium naphthalene sulfonate,

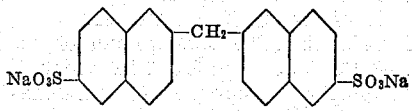

The following illustrates the invention, all parts referred to herein being by weight:

Commercial Douglas fir bark dust 98%, of which passed a 100 mesh screen was used as obtained in a number of the batches described below. In another batch, commercial redwood bark dust 90% of which passed a 100 mesh screen, was also used as obtained. In a third batch, gumwood bark dust, 92% of which passed a 100 mesh screen was used as obtained. The above comminuted barks were extracted as follows: Ten parts of each of the comminuted barks were slurried with 90 parts of a 2% sodium hydroxide solution and the mixtures were heated at 80—90° C. for thirty minutes. The resulting suspensions were centrifuged at 1800 R. P. M. for twenty minutes and the clarified extracts were decanted from the insoluble residues. The residues were reslurried in water and centrifuged a second time. The wash waters were decanted from the cellulosic materials and the wet cellulosic residues were mixed with the synthetic rubber latex and carbon black slurry (except in the check or control where the cellulosic material was not included in the latex-carbon black slurry mixture).

The synthetic rubber latex was produced from an emulsion prepared according to the following formulation:

| | Parts |
|---|---|
| Butadiene | 75 |
| Styrene | 25 |
| Potassium soap of disproportionated rosin acid | 4 |
| Sodium salt of condensation product of formaldehyde and naphthalene sulfonic acid | 0.15 |
| Cumene hydroperoxide | 0.11 |
| Trisodium phosphate dodecahydrate | 0.3 |
| Ferrous sulfate heptahydrate | 0.19 |
| Potassium pyrophosphate | 0.21 |
| Mixed tertiary mercaptans | 0.24 |
| Water | 200 |

The above formulation is the conventional type of so-called "sugar-free" formulation for GR–S polymerizations at low temperatures (41° F.). The mixed tertiary mercaptans comprised 60% tertiary dodecyl mercaptan, 20% of tertiary tetradecyl mercaptan, and 20% of tertiary hexadecyl mercaptan, and is used as a regulator; the potassium soap of disproportionated rosin acid is the primary emulsifier; the sodium salt of the condensation product of formaldehyde and naphthalene sulfonic acid is the auxiliary surface-active dispersing agent; the trisodium phosphate is a buffer; the cumene hydroperoxide is a typical organic peroxygen type catalyst; and the sodium pyrophosphate and the ferrous sulfate are activators for the cumene hydroperoxide catalyst. Polymerization was carried out at 41° F. for about 14 hours, to 60% conversion of polymerizable monomers, after which the polymerization was stopped by adding 0.23 part of dinitrochlorobenzene in styrene (5% solution). Unreacted butadiene was vented off and unreacted styrene was removed by steam distillation under reduced pressure. 1.5 parts of an antioxidant (condensation product of diphenylamine and acetone) was added to the latex in the form of an aqueous emulsion.

An aqueous slurry of 50 parts of carbon black was prepared by adding, while agitating, a ground pelletized high abrasion furnace black and 250 parts of water containing 1 part (dry weight) of the present commercially used partially desulfonated sodium lignin sulfonate dispersing agent.

An amount of the carbon black slurry to give 50 parts of carbon black was added and mixed into an amount of the synthetic rubber latex to give 100 parts of synthetic rubber solids. This is batch A which had no cellulosic residue from the alkali extraction of ground bark, incorporated with the carbon black slurry and latex mixture. In preparing batches B, C, D and E, slurries were prepared by adding 50 parts of the same carbon black as for A and 250 parts of water to four separate containers, then adding 5, 10, 15 and 20 parts (dry weight), respectively, of the wet cellulosic residue from the alkali extraction of comminuted Douglas fir bark, and then adding sufficient partially disulfonated sodium lignin sulfonate dispersing agent under agitation to give a fluid slurry. These slurries were then added in order to four vessels each containing an amount of the same synthetic rubber latex used for A, to give 100 parts of synthetic rubber solids. Batches F and G were like C except they contained in place of 10 parts of cellulosic residue from Douglas fir bark, 10 parts (dry weight) each of the wet cellulosic residues from the extraction of comminuted redwood bark and gumwood bark, respectively. These mixtures A to G were coagulated by adding, with good agitation, a solution containing 2.4% sodium chloride and 0.4% sulfuric acid until flocculations were complete to yield crumbs that were then filtered, washed, and dried.

The dried synthetic rubber-carbon black mixture (batch A) and the dried synthetic rubber-carbon black-cellulosic residue mixtures (batches B to G), were compounded in a conventional recipe by mixing 150 parts of the batches A to G with 1 part of stearic acid, 5 parts of coal tar softener, 2 parts of sulfur, 3 parts of zinc oxide, 1.5 parts of benzothiazyldisulfide and 0.5 part of diphenyl guanidine. Samples of the batches A to G were tested for calender shrinkage as described in an article by White et al. published in "Industrial and Engineering Chemistry," vol. 37 (1945), page 767. Dimensionally identical strips of each of the samples were calendered under identical temperature conditions from stocks A to G and their length was measured as they left the calender nip. The samples were then allowed to cool and shrink freely for 8 hours, after which the length was again measured for each sample. The figures expressed below represent the original length less the length after shrinkage, divided by the original length; in other words, the percentage of shrinkage.

| Sample | A | B | C | D | E | F | G |
|---|---|---|---|---|---|---|---|
| Percent Shrinkage | 63 | 41 | 37 | 36 | 36 | 38 | 40 |

The above table shows a desirable reduction in shrinkage characteristics in samples B to G over sample A. Tests of high temperature and aged physical properties of the vulcanized compounds from samples A to G showed that the vulcanizates from batches B to G were not inferior to the cured batch A samples. The samples for testing were cured at 292° F. for various times to find the optimum cure in the usual manner. The high temperature modulus, tensile strength and elongation tests were run at 205° F. on the unaged cured samples (called "Unaged stress-strain at 205° F."). The aged modulus, tensile strength and elongation tests were run at room temperature after aging the cured samples 96 hours at 212° F. (called "Aged stress-strain at room temperature"). The results are shown in the following table:

| | Time of Cure (min.) | Sample | | | | | | |
|---|---|---|---|---|---|---|---|---|
| | | A | B | C | D | E | F | G |
| Unaged stress-strain at 205° F.: | | | | | | | | |
| 300% Modulus, p. s. i. | 25 | 1,670 | 1,530 | 1,380 | 810 | 780 | 1,350 | 990 |
| | 50 | | 1,800 | | 1,280 | 1,130 | | 1,390 |
| | 100 | | | | 1,460 | 1,440 | 1,880 | 1,650 |
| Tensile Strength, p. s. i. | 50 | 1,770 | 1,800 | 1,530 | 1,930 | 1,800 | 1,590 | 1,830 |
| | 100 | 1,780 | 1,830 | 1,830 | 1,650 | 1,770 | 1,880 | 1,820 |
| Elongation at break, percent | 50 | 270 | 300 | 295 | 430 | 450 | 290 | 360 |
| | 100 | 270 | 290 | 290 | 320 | 360 | 300 | 320 |
| Aged stress-strain at room temperature: | | | | | | | | |
| 300% Modulus, p. s. i. | 50 | 2,320 | | | 2,610 | 2,570 | | |
| | 100 | 3,160 | 3,010 | 2,870 | 2,520 | 2,600 | 2,830 | 2,950 |
| Tensile Strength, p. s. i. | 50 | 2,330 | 2,990 | 3,140 | 2,870 | 2,650 | 2,840 | 2,940 |
| | 100 | 3,180 | 3,180 | 3,240 | 3,150 | 2,910 | 3,120 | 3,020 |
| Elongation, percent | 50 | 330 | 270 | 290 | 320 | 310 | 280 | 280 |
| | 100 | 310 | 320 | 340 | 360 | 340 | 320 | 320 |

From the above, it may be seen that the wet residue from the alkali extraction of comminuted tree bark when incorporated in mixtures of synthetic rubber latex and aqueous suspensions of carbon black before coagulation advantageously reduces the calender shrinkage of compounds made from the coagulated and dried mixtures without the usual accompanying loss in physical characteristics in the final cured compounds that one finds when other finely divided inert fillers are incorporated in conventional rubber compounds.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The product of the co-coagulation of solids from suspension in an aqueous medium comprising a mixture of a synthetic rubber latex emulsion polymerizate of material selected from the group consisting of butadiene-1,3 hydrocarbons, chloro-2-butadiene-1,3, mixtures thereof, and mixtures of such butadienes-1,3 with up to 70% of said mixture of material which contains a single $CH_2=C<$ group and is copolymerizable with such butadienes-1,3, and an aqueous slurry of carbon black, and the wet cellulosic residue separated from the liquid alkali extract of an alkali extraction of comminuted bark of a tree of the group consisting of Douglas fir, redwood and gumwood, the aqueous medium of the suspension being free from the alkali extract separated from the bark residue, the bark residue being in amount from 5 to 50 parts per 100 parts of the synthetic rubber and the carbon black being in amount from 30 to 100 parts per 100 parts of the synthetic rubber.

2. A vulcanizate of the product of claim 1.

3. The product of claim 1 in which the synthetic rubber is a copolymer of butadiene-1,3 and styrene.

4. A vulcanizate of the product of claim 3.

5. The process which comprises mixing with synthetic rubber latex emulsion polymerizate of material selected from the group consisting of butadiene-1,3 hydrocarbons, chloro-2-butadiene-1,3, mixtures thereof, and mixtures of such butadienes-1,3 with up to 70% of said mixture of material which contains a single $CH_2=C<$ group and is copolymerizable with such butadienes-1,3, an aqueous suspension of carbon black and the wet cellulosic residue separated from the liquid alkali extract of an alkali extraction of comminuted bark of a tree of the group consisting of Douglas fir, redwood and gumwood, the aqueous medium of the suspension being free from the alkali extract separated from the bark residue, the bark residue being in amount from 5 to 50 parts per 100 parts of the synthetic rubber and the carbon black being in amount from 30 to 100 parts per 100 parts of the synthetic rubber, coagulating the mixture, and separating the coagulum therefrom.

6. The process of claim 5 in which the synthetic rubber latex is an aqueous emulsion polymerizate of a mixture of butadiene-1,3 and styrene.

References Cited in the file of this patent

UNITED STATES PATENTS

| Number | Name | Date |
|---|---|---|
| 2,548,757 | Adams | Apr. 10, 1951 |

OTHER REFERENCES

Goodloe Rubber Age, vol. 61, pages 697–702 (1947).